United States Patent [19]

Shohara et al.

[11] Patent Number: 5,093,741
[45] Date of Patent: Mar. 3, 1992

[54] LIQUID CRYSTAL DISPLAY DEVICE

[75] Inventors: Kiyoshi Shohara; Hoko Hirai, both of Yokohama; Yoshihiro Kinoshita, Yamato; Hitoshi Hatoh; Shoichi Matsumoto, both of Yokohama, all of Japan

[73] Assignee: Kabushiki Kaisha Toshiba, Kawasaki, Japan

[21] Appl. No.: 592,462

[22] Filed: Oct. 5, 1990

[30] Foreign Application Priority Data

Oct. 6, 1989 [JP] Japan .................. 1-260102

[51] Int. Cl.⁵ .............................. G02F 1/13
[52] U.S. Cl. ........................ 359/90; 359/85; 359/92; 359/106
[58] Field of Search ............ 350/331 R, 332, 346, 350/349, 350 R, 347 E, 350 S, 333

[56] References Cited

U.S. PATENT DOCUMENTS

| | | | |
|---|---|---|---|
| 4,482,472 | 11/1984 | Carr et al. | 350/346 |
| 4,536,060 | 8/1985 | Takamatsu et al. | 350/346 |
| 4,556,745 | 12/1985 | Carr et al. | 350/346 |
| 4,697,884 | 10/1987 | Amstutz et al. | 350/346 |
| 4,741,859 | 5/1988 | McDonnell et al. | 350/346 |
| 4,902,105 | 2/1990 | Welzen et al. | 350/346 |

FOREIGN PATENT DOCUMENTS

| | | | |
|---|---|---|---|
| A0173608 | 7/1985 | European Pat. Off. | |
| A2416519 | 8/1979 | France | |
| 0038557 | 3/1980 | Japan | 350/346 |
| 0118017 | 9/1980 | Japan | 350/346 |
| 61-52632 | 3/1986 | Japan | |
| A661361 | 12/1983 | Switzerland | |
| 1549159 | 7/1979 | United Kingdom | 350/346 |
| 2123163 | 1/1984 | United Kingdom | 350/346 |

OTHER PUBLICATIONS

Ogawa et al., "New Electro-optical effect: Optical Activity of Electric-field-induced Twisted-nematic liquid Crystal", Electronics Letters; vol. 12, No. 3, Feb. 5, 1976, pp. 70–71.

Primary Examiner—Rolf Hille
Assistant Examiner—Tan Ho
Attorney, Agent, or Firm—Cushman, Darby & Cushman

[57] ABSTRACT

A liquid crystal display device has a birefringence control type liquid crystal display unit including a pair of substrates having electrodes on their first major surfaces and arranged with a predetermined distance therebetween such that the electrodes face each other, a liquid crystal material having a negative dielectric anisotropy, the material being disposed between the substrates, liquid-crystal molecules of the liquid crystal material being aligned vertically such that longitudinal axes of said molecules are inclined at a slight pretilt angle in respect of an axis vertical to the substrates when no voltage is applied to the electrodes, a pair of polarizing plates arranged on second major surfaces of the substrates, and a device circuit for driving the liquid crystal device in a multiplex manner. This device is characterized in that the liquid crystal material has a helical pitch in the state wherein the material is not disposed between the substrates, and the relationships of $d \leq p$ and $50 \leq f \cdot d^2/p$ are satisfied, where $d$ = the distance (μm) between the substrates, $p$ = the helical pitch of liquid crystal material disposed between the substrates, and $f$ = the frame frequency (Hz) in the drive mode of the device.

6 Claims, 1 Drawing Sheet

LIQUID CRYSTAL DISPLAY DEVICE

BACKGROUND OF THE INVENTION

1. Field of the Invention

The present invention relates generally to a liquid crystal display device, and in particular to a bire-fringence control type liquid crystal display device such as an ECB (Electrically Controlled Birefringence) type or a DAP (Deformation of Aligned Phases) type.

2. Description of the Related Art

In a conventional birefringence control type liquid crystal display device, a pair of substrates each having transparent electrode and each having a surface orientation-treated in one direction are opposed to each other, and a liquid crystal material having a negative dielectric anisotropy is disposed between the substrates. Liquid crystal molecules are vertically aligned. Thus, a liquid crystal cell is formed. Polarizing plates are arranged on both sides of the liquid crystal cell.

In this liquid crystal display device, the liquid crystal presents a homeotropic texture state in which axes of liquid crystal molecules are substantially normal to the substrates when no voltage is applied to the electrodes. In this state, the direction of light incident in the liquid crystal display device coincides with the longitudinal axes (optical axes) of liquid crystal molecules; therefore, the liquid crystal cell does not exhibit birefringence effect. When the two polarizing plates are arranged such that the polarizing axes thereof are perpendicular to each other, the light entering the liquid crystal display device vertically is not subjected to the birefringence effect. Since the light cannot be transmitted through polarizing plate the display device is set in the dark state. On the other hand, when a voltage higher than a threshold is applied to the electrodes, the liquid crystal molecules are inclined at right angles with an electric field. Consequently, the liquid crystal cell exhibits birefringence effect and part of the incident light passes through the polarizing plate. Thus, the display device is set in the light state.

In order to attain uniform display characteristics, it is desirable that the directions of liquid crystal molecules be identical, and not at random, when voltage is applied to the electrodes. For this purpose, a previously processed homeotropic surface of the substrate is rubbed and, the liquid crystal molecules are inclined at a slight angle in a predetermined direction (i.e. a pretilt angle is provided).

In general, the liquid crystal display device is driven in a time-sharing manner ("multiplex driving") to reduce a number of electrical connection between a driving circuit and the liquid crystal display device. At the time of multiplex driving, some times birefringence control type LCD show an instability phenomenon of molecular alignment. The instability phenomenon is considered to be similar to a symptomatic phenomenon of a dynamic scattering (DS) effect. In this instability phenomenon, the liquid crystal molecules are inclined not only in the direction of the pretilt angle, but also in other directions. In addition, a reverse tilt portion occurs, and this portion moves with the passage of time. Consequently, the quality of displayed images is considerably degraded in the liquid crystal display device in which this instability phenomenon occurs. Specifically, the contrast is deteriorated, and non-uniformity occurs in the displayed images.

SUMMARY OF THE INVENTION

The object of the present invention is to provide a liquid crystal display device capable of attaining stable excellent image quality, with fast response time and high display quality, wherein no instability phenomenon of liquid crystal molecular alignment is caused when the display device is driven.

This object is achieved by a liquid crystal display device comprising:

a birefringence control type liquid crystal display unit including a pair of substrates having electrodes on their first major surfaces and arranged with a predetermined distance therebetween such that said electrodes face each other; a liquid crystal material having a negative dielectric anisotropy, said material being disposed between said substrates, liquid-crystal molecules of said liquid crystal material being aligned vertically such that longitudinal axes of said molecules are inclined at a slight pretilt angle in respect of an axis vertical to said substrates when no voltage is applied to said electrodes; a pair of polarizing plates arranged on second major surfaces of the substrates; and a drive circuit for driving said liquid crystal device in a multiplex manner, characterized in that said liquid crystal material has a helical pitch in the state wherein said material is not disposed between said substrates, and the relationships of $d \leq p$ and $50 \leq f \cdot d^2/p$ are satisfied, where $d =$ the distance ($\mu$m) between the substrates, $p =$ the helical pitch of said liquid crystal material disposed between said substrates, and $f =$ the frame frequency (Hz) in the drive mode of the device.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawing, which is incorporated in and constitutes a part of the specification, illustrates a presently preferred embodiment of the invention and, together with the general description given above and the detailed description of the preferred embodiment given below, serves to explain the principles of the invention.

DETAILED DESCRIPTION OF THE PREFERRED EMBODIMENTS

Figure 1:
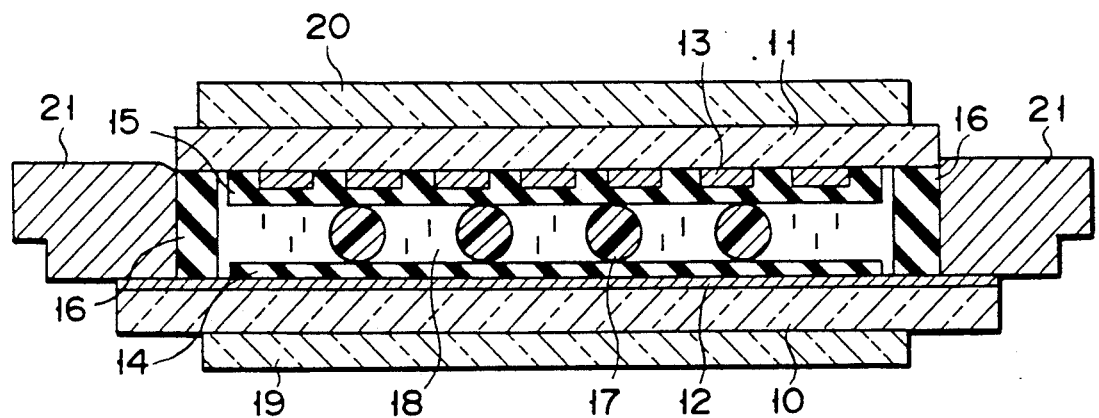
FIG. 1 is a cross-sectional view showing the structure of a liquid crystal display device according to an embodiment of the present invention.

The inventors of this invention have found, through a number of experiments, that the occurrence of the aforementioned instability phenomenon of liquid crystal molecular alignment in the birefringence control type liquid crystal device depends on the distance between the substrates, the frame frequency at the time of driving, and the operation temperature. In the multiplex driving, liquid crystal molecules are excited by an intermittently applied driving voltage. The frame frequency $f(Hz)$ at the time of driving is represented by $1/T$ or an inverse number of a period $T$ (sec) in which liquid crystal molecules are excited by application of voltage.

The research conducted by the inventors has demonstrated that the possibility of the instability phenomenon of molecular alignment increases, as the distance between the substrates decreases, the frame frequency at the time of driving decreases and the operation temperature rises. In other words, in order to avoid the instability phenomenon of molecular alignment, it is necessary to increase the distance between the substrates, increase the frame frequency at the time of driving and decrease the operation temperature. For example, in the case where the device is driven at a 1/100 duty, when the distance between substrates is set to 7 μm, the drive frame frequency is 70 Hz and the operation temperature is 25° C., there can be obtained an excellent image which is free from instability phenomenon of molecular alignment and has a high contrast and a wide angle of visibility. On the other hand, when the distance between substrates is set to 4 μm or when the operation temperature is set to 50° C., an instability phenomenon of molecular alignment occurs and the quality of image is considerably degraded.

If the distance between the substrates is increased, the response time of the liquid crystal display device is increased, because the response time is inversely proportional to the square of the distance between substrates. If the frame frequency is increased, the power consumed by the display device increases. In addition, since the operation speed of IC elements for driving the liquid crystal has the limitation, it is not allowed to increase the frame frequency above a predetermined value. Furthermore, if the operation temperature is lowered, the range of operation temperature of the display device is narrowed.

As has been described above, none of the above methods is effective.

The inventors conducted a further research and developed a liquid crystal display device wherein the distance between the substrates is small, the drive frame frequency is set to a practical value and the operation temperature is set within a practical range, whereby an instability phenomenon of molecular alignment does not occur at the time of driving, and a stable excellent display quality is attained with fast response time of the device.

In the liquid crystal display device of the present invention, a liquid crystal material having a twist property is employed. When the liquid crystal material is sealed in the liquid crystal cell, the substrate surface of which was subjected to alignment treatment, the liquid crystal molecules of the material are aligned vertically such that longitudinal axes of the molecules are inclined a slight pretilt angle in respect of an axis vertical to the substrates. On the other hand, when voltage is applied to the liquid crystal display device and the liquid crystal molecules are tilted, the molecules are tilted and simultaneously twisted. Specifically, the respective liquid crystal molecules are tilted in one direction, and the molecules, as a whole are twisted. The twisting force suppresses the occurrence of the instability phenomenon of molecular alignment. Thus, desirable display quality is attained. In order to give a twisting force to the liquid crystal material, a so-called chiral dopant is added to the material.

In the liquid crystal display device of the present invention, the possibility of the instability phenomenon of molecular alignment decreases as the helical pitch p decreases, the frame frequency f increases and the distance d between substrates is greater. The study by the inventors demonstrated that the possibility of the instability phenomenon of molecular alignment is very low when $50 \leq f \cdot d2/p$, where p is the helical pitch (μm) of the liquid crystal material disposed between the substrates, d is the distance (μm) between substrates, and f is the drive frame frequency (Hz).

However, when the helical pitch p of the liquid crystal material in the material is too small, relative to the distance d between the substrates, that is, when the twisting force is too strong, the molecules are twisted even when no voltage is applied. Consequently, an undesirable orientation or so-called focal conic state occurs in the liquid display device. In addition, a hysteresis phenomenon (memory property) appears when a voltage is applied. These phenomena are undesirable in the practical use of the device. The phenomena can be prevented when the distance d between substrates and the helical pitch p of molecules have the relationship: $d \leq p$.

Under the situation, it is desirable that the distance d be 2 to 15 μm. If the distance d is less than 2 μm, the manufacture of the liquid crystal cell becomes difficult. If the distance d is greater than 15 μm, the response time of the device is increased. It is more desirable that the distance d be 3 to 10 μm. The helical pitch of liquid crystal material disposed between the substrates, therefore, should desirably be at least 3 μm and meet the relation of $d \leq p$.

The frame frequency in the drive mode should desirably be 30 Hz or higher. If the frame frequency is less than 30 Hz, flickering occurs on the display device.

A embodiment of the liquid crystal display device of this invention will now be described with reference to the accompanying drawing.

Transparent electrically conductive films made of ITO (Indium-Tin-Oxide), etc., are formed on glass substrates 10 and 11 by a conventional method. The conductive films are patterned to form striped transparent electrodes 12 and 13.

Vertical orientation films 14 and 15 made of a monocarboxylatochromium complex, long-chain alkyl silane, etc. is formed on the transparent electrodes 12 and 13 by a conventional method. It is desirable that the long-chain alkyl silane be alkyl silane having ten or more carbons. In this embodiment, alkyl silane having 18 carbons is used. The surfaces of the vertical orientation films 14 and 15 are rubbed. The rubbing process is performed such that the direction in which one of the vertical orientation films 14 and 15 is rubbed becomes identical to that in which the other vertical orientation film is rubbed when both substrate are arranged to face each other. Though the rubbed films of a monocarboxylatochromium complex, long-chain alkyl silane, etc. are used as vertical alignment films in this embodiment, SiO oblique deposition films can also be used.

The substrates 10 and 11 are arranged substantially in parallel such that the striped transparent electrodes 12 and 13 cross each other at right angles. The opening edge defined by the parallel-arranged substrates 10 and 11 is sealed by a seal agent 16 made of an epoxy adhesive. Spacers 17 for keeping a distance d are interposed between the substrates 10 and 11. B changing the diameter of spacer 17, the distance d between the substrates 10 and 11 can be varied. A liquid crystal material 18 is disposed in the space defined by the substrates 10 and 11 and the seal agent 16. In this manner, a liquid crystal cell is constituted. When no voltage is applied to the electrodes 12 and 13, the liquid crystal molecules in the liquid crystal material 18 disposed in the liquid crystal cell are vertically oriented such that longitudinal axes of the molecules have a slight pretilt angle in respect to an axis normal to the substrates. In this case, it is desirable that the pretilt angle be 2° or less, because a lowering of contrast occurs, if the pretilt angle exceeds 2°. It is most desirable that the pretilt angle be 0.3° to 2°.

The liquid crystal material 18 is prepared by adding a predetermined amount of a chiral dopant to a host liquid crystal material 18. As a host liquid crystal material, an ester nematic liquid crystal material having a negative dielectric anisotropy, such as ZLI-389 (manufactured by E-Merch Corporation) or EN-18 (manufactured by Chisso Corporation) may be used. Examples of the chiral dopant are S-811 (manufactured by E-Merch Corporation) capable of providing left-handed-helical orientation of a liquid crystal molecule represented by structural formula (I) shown below, and CB-15 (manufactured by B. D. H. Corporation) capable of providing a right-handed-helical orientation of a liquid crystal molecule represented by structural formula (II) shown below. By changing the amount of the chiral dopant to be added, the helical pitch of material can be varied. A desirable amount of the chiral dopant to be added is less than 10% by weight.

If the amount of the chiral dopant is greater than 10% by weight, the helical pitch p of the liquid crystal material is too small relative to the distance d between the substrates.

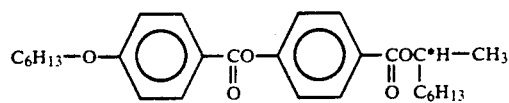
(I)

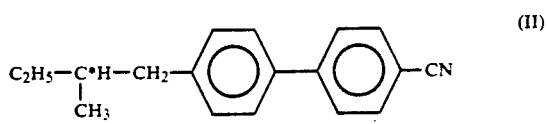
(II)

Polarizing plates 19 and 20 are arranged on the substrates 10 and 11 so as to constitute crossed Nicols. The liquid crystal cell is connected to a multiplex drive circuit board 21. In this manner, an XY-matrix drive type liquid crystal display device is constituted.

Regarding this type of liquid display display device, the values of the distance d between the substrates, the helical pitch p and the drive frequency f were changed, as shown in Table 1 (below), and the multiplex driving was performed with the time-sharing number set to 100. The evaluation results relating to the display quality are stated in Table 1. When the liquid crystal material was disposed, the orientation of the material was confirmed, and the material, in which undesirable orientation o so-called focal conic state occurs and in which memory phenomenon appears when a voltage is applied, were excluded from tests of the display quality evaluation. The display quality was examined by experiments as to whether or not the instability phenomenon of molecular alignmeht occurred at the operation temperatures of 25° C. and 50° C. In Table 1, 'o' indicates a high display quality, 'Δ' a partly low display quality, and 'x' a bad display quality.

The helical pitch of liquid crystal material disposed between the substrates was controlled by changing the kind of the host liquid crystal material, the kind of the chiral dopant, and the amount of the added chiral dopant.

TABLE 1

| Sample No. | Host Liquid Crystal Material | Chiral Dopant | Chiral Dopant Content (wt %) | Distance between substrates d (μm) | Helical Pitch P (μm) |
|---|---|---|---|---|---|
| 1 | ZLI-389 | CB-15 | 1.6 | 3.1 | 8.0 |
| 2 | ZLI-389 | S-811 | 0.5 | 5.0 | 20 |
| 3 | ZLI-389 | S-811 | 0.5 | 5.0 | 20 |
| 4 | ZLI-389 | S-811 | 0.5 | 5.0 | 20 |
| 5 | ZLI-389 | S-811 | 0.9 | 5.0 | 10 |
| 6 | ZLI-389 | S-811 | 0.5 | 5.0 | 20 |
| 7 | EN-18 | CB-15 | 0.7 | 6.9 | 20 |
| 8 | EN-18 | CB-15 | 0.7 | 6.9 | 20 |
| 9 | EN-18 | CB-15 | 0.3 | 9.0 | 50 |
| 10 | ZLI-389 | CB-15 | 1.6 | 3.1 | 8.0 |
| 11 | ZLI-389 | CB-15 | 0.3 | 3.1 | 40 |
| 12 | ZLI-389 | S-811 | 0.5 | 5.0 | 20 |
| 13 | ZLI-389 | S-811 | 2.3 | 5.0 | 4.0 |
| 14 | ZLI-389 | S-811 | 0.2 | 5.0 | 40 |
| 15 | ZLI-389 | S-811 | 0.5 | 5.0 | 20 |
| 16 | EN-18 | CB-15 | 2.2 | 8.9 | 6.0 |
| 17 | EN-18 | CB-15 | 0.3 | 9.0 | 50 |

| Sample No. | Vertical Orientation Agent | Orientation | Drive Frequency f (Hz) | f · d²/P | Display Quality 25° C. | Display Quality 50° C. |
|---|---|---|---|---|---|---|
| 1 | Monocarboxylatochromium Complex | o | 70 | 84.1 | o | o |
| 2 | Monocarboxylatochromium Complex | o | 100 | 125.0 | o | o |
| 3 | Monocarboxylatochromium Complex | o | 70 | 87.5 | o | o |
| 4 | Monocarboxylatochromium Complex | o | 50 | 62.5 | o | o |
| 5 | Monocarboxylatochromium Complex | o | 30 | 75.0 | o | o |
| 6 | Long-chain Alkyl Silane | o | 70 | 87.5 | o | o |
| 7 | Monocarboxylatochromium Complex | o | 70 | 166.6 | o | o |
| 8 | Monocarboxylatochromium Complex | o | 30 | 71.4 | o | o |
| 9 | Monocarboxylatochromium Complex | o | 70 | 113.4 | o | o |
| 10 | Monocarboxylatochromium Complex | o | 30 | 36.0 | X | X |
| 11 | Monocarboxylatochromium Complex | o | 70 | 16.8 | X | X |
| 12 | Monocarboxylatochromium Complex | o | 30 | 37.5 | X | X |
| 13 | Monocarboxylatochromium Complex | X | — | — | — | — |
| 14 | Monocarboxylatochromium Complex | o | 70 | 43.8 | o | Δ |

TABLE 1-continued

| 15 | Long-chain Alkyl Silane | O | 30 | 37.5 | X | X |
| 16 | Monocarboxylatochromium Complex | X | — | — | — | — |
| 17 | Monocarboxylatochromium Complex | O | 30 | 48.6 | O | Δ |

As is obvious from Table 1, when $d \leq p$ and $50 \leq f \cdot d^2/p$, high image quality was attained.

The tests of display quality depend not upon the kind of vertical alignment layer and the kind of liquid crystal material, but upon the distance d between substrates, the helical pitch p of liquid crystal material, and the drive frame frequency f. As long as the distance d between substrates, the helical pitch p and the frame frequency f satisfy the relationship of $d \leq p$ and $50 \leq f \cdot d^2/p$, the instability phenomenon of the molecular alignment does not occur at the time of multiplex driving and high display quality can be attained. In addition, this liquid crystal display device has a fast response time, a high contrast, and a wide angle of visibility.

In this embodiment, the liquid crystal display device was driven in a multiplex manner with the time-sharing number of 100; however, the same advantage can be obtained with another time-sharing number.

The present invention is applicable not only to a simple matrix, but also to an active matrix in which an active device and a capacitor are connected to each element.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A liquid crystal display device comprising:
   a birefringence control type liquid crystal display unit including a pair of substrates having electrodes on their first major surfaces and arranged with a predetermined distance therebetween such that said electrodes face each other; a liquid crystal material having a negative dielectric anisotropy, said material being disposed between said substrates, liquid-crystal molecules of said liquid crystal material being aligned vertically such that longitudinal axes of said molecules are inclined at a slight pretilt angle in respect of an axis vertical to said substrates when no voltage is applied to said electrodes;
   a pair of polarizing plates arranged on second major surfaces of the substrates; and
   a drive circuit for driving said liquid crystal device in a multiplex manner,
   wherein said liquid crystal material has a helical pitch, and the relationships of $d \leq p$ and $50 \leq f \cdot d^2/p$ are satisfied, where d = the distance (μm) between the substrates, p = the helical pitch of said liquid crystal material, and f = the frame frequency (Hz) in the drive mode of the device.

2. The device according to claim 1, wherein the distance d between the substrates is 2 to 15 μm.

3. The device according to claim 1, wherein the frame frequency f is 30 or above.

4. The device according to claim 1, wherein said liquid crystal material is produced by adding a chiral dopant to a host liquid crystal material.

5. The device according to claim 4, wherein the amount of the chiral dopant to be added is less than 10% by weight.

6. The device according to claim 1, wherein the pitch p is 3 μm or more.

* * * * *